United States Patent [19]

Adams et al.

[11] 4,162,975

[45] Jul. 31, 1979

[54] HIGH VELOCITY COMPOSITE STRAINER

[75] Inventors: Ralph C. Adams, Somers Point; Arthur C. Epstein, Hamilton Square, both of N.J.; William J. Maroney, Williston Park, N.Y.; Albert B. Mindler, Princeton, N.J.

[73] Assignee: Permutit Company, Inc., Paramus, N.J.

[21] Appl. No.: 875,911

[22] Filed: Feb. 7, 1978

[51] Int. Cl.² ............... B01D 25/02; B01D 25/32
[52] U.S. Cl. ................................ 210/124; 210/315; 210/411
[58] Field of Search ............... 210/314–316, 210/333 R, 335, 337–339, 342, 411, 497 R, 123, 124

[56] References Cited

U.S. PATENT DOCUMENTS

| | | | |
|---|---|---|---|
| 597,822 | 1/1898 | Martin | 210/314 X |
| 793,017 | 6/1905 | McAfee | 210/411 X |
| 2,646,126 | 7/1953 | Goodner | 210/315 X |

OTHER PUBLICATIONS

Croll-Reynolds Engineering Co. Bulletin C-18.

Primary Examiner—William A. Cuchlinski, Jr.
Attorney, Agent, or Firm—Omri M. Behr

[57] ABSTRACT

There is provided a composite strainer unit suitable for use with particulate substances in a liquid environment comprising a first strainer unit in combination with a second strainer unit. The first strainer unit having a much larger effective area than the second unit whereby, at any given speed the working liquid will pass through the first strainer unit at low velocity and through the second strainer unit at high velocity. The composite unit is provided with a valve means whereby flow access to the first strainer unit may be closed to permit high velocity flow through the second unit only.

23 Claims, 3 Drawing Figures

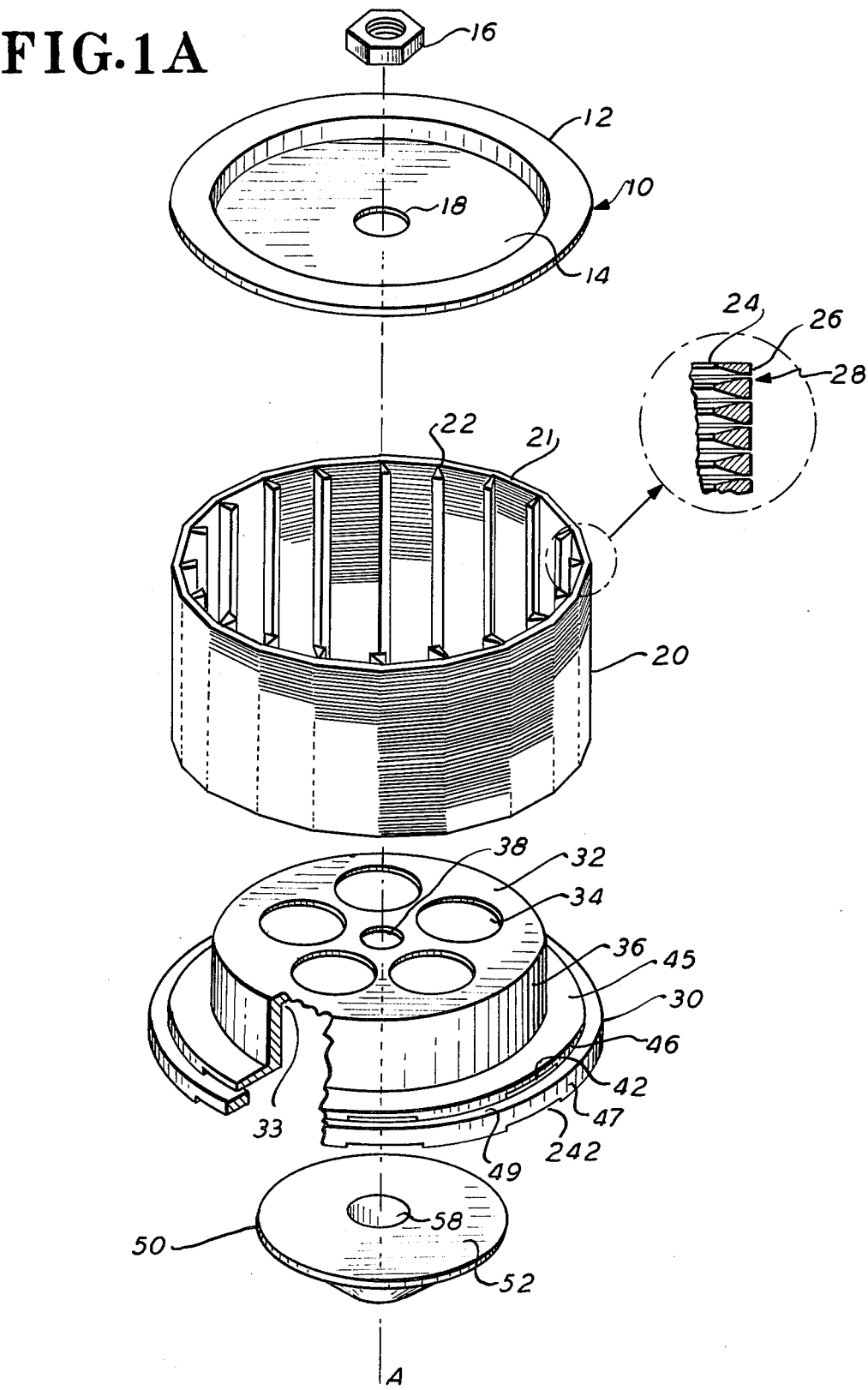

HIGH VELOCITY COMPOSITE STRAINER

BACKGROUND OF THE INVENTION

Strainers have long been employed in filter or ion exchange resin environments in order to permit flow therethrough in either direction without a loss of the filtration or resin particles. Widely used among such strainers is a form of strainer known as the Johnson well screen which comprises a substantially cylindrical unit having in fact a polygonal cross section. The unit comprises a plurality of metal strips of substantially triangular cross section, the apex of said strip pointing inwardly to the center of the unit. The strips are held together by spacer units provided circumferentially around the inner circumference of the filter unit and parallel to the axis thereof. In such a unit the circumferential slots are open for approximately 90% of the circumference of the unit between any pair of slots. The triangular cross section of the strips permits a higher volume of throughput than would be possible if the space between the strips was uniformly small, that is to say restricted to the spacing necessary to exclude the particulate matter in the unit.

Filtration units and ion exchange columns require flow in two directions, an operating (generally a downward) direction and a backwash (generally upward) direction. In the operative, that is to say downward direction, screens of the Johnson well screen type are very satisfactory. Unfortunately problems occur in the use of such screens in the backwash operation.

The purpose of the backwash step in filters is to clean the filtration medium. In ion exchange resins, particularly in mixed bed (cation and anion) ion exchangers, the backwash step also serves, inter alia, to separate the anion and cation resins which have different densities and can therefore be separated by floatation in the column provided that an adequate degree of agitation is supplied. If the degree of agitation is not adequate the separation of the two types of resin is not complete leading to problems at subsequent points of the regeneration step which in turn do not permit the column to be returned to operation as rapidly as would be desirable, leading to increased losses in down time.

In the case of filtration media the problem is not quite so serious but leads to a loss of efficiency since the dirt collecting in the filtration medium is not adequately washed out. The reason for inadequate separation lies in the formation of dead spaces in the filtration or ion exchange tank due to the absence of adequate water velocity. These dead spaces typically are found on top of the strainer unit between strainers and in the zones proximate to the outer walls of the ion exchange or filter column. Heretofore the only available method of substantially reducing the dead space problem was by the rather close spacing of strainers used. Such a solution is expensive and raises additional design problems. It would therefore be desirable to provide a strainer which permits high volume, low velocity flow in the downward, or operative, direction while being able to provide high velocity efficient mixing flow in the backwash direction, still maintaining the capacity for separation of fine particles from the working liquid environment.

SUMMARY OF THE INVENTION

There is provided a composite high velocity strainer means. The strainer means comprises a low velocity, high area strainer such as a Johnson well screen, a closable separator section located within the said low velocity screen, a plurality of small slots in said separator unit and a valve means for severing flow connection between the low velocity screen and the plurality of small slots.

When the environment in which the device is placed, such as an ion exchange column, is operated in the downflow direction the screen blocks the downward passage of the particles while permitting downward passage of the liquid environment. When operated in the backflow direction a valve means, suitably a float valve means closes the separator unit from the principal low velocity screen permitting the up flowing liquid to pass solely through the slots in said separator unit. Since the total area available for outflow is thus very substantially reduced, the stream velocity at the remaining orifices for a given volume per unit time liquid flow is vastly increased thus giving rise to great increases in cleaning and/or separation efficiency.

DETAILED DESCRIPTION OF THE DRAWINGS

Figure 1B:
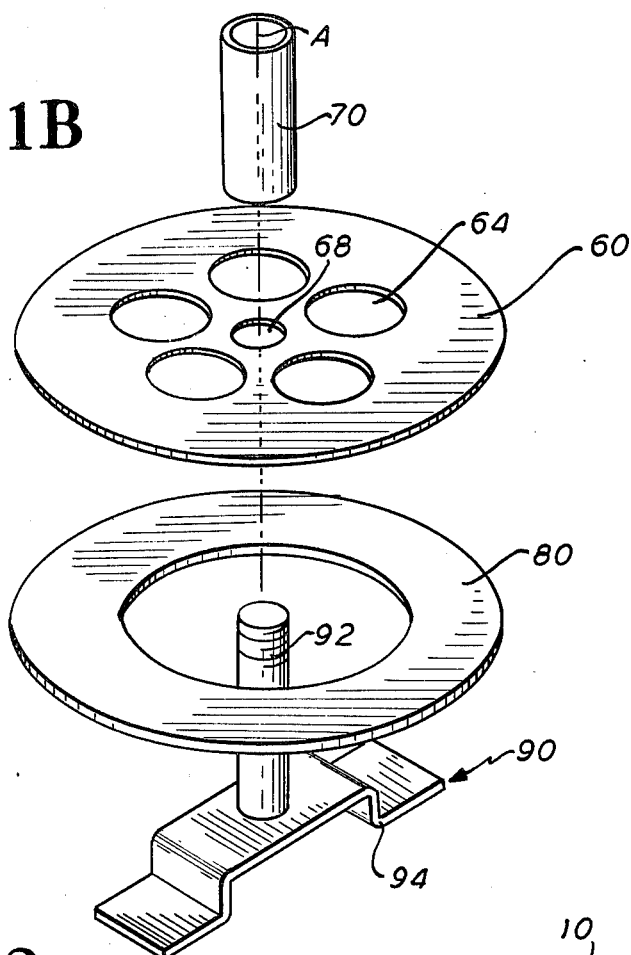
FIG. 1 comprises two portions, FIG. 1A and FIG. 1B, constituting, when viewed together, a downwardly directed exploded elevational perspective view of the device of the present invention.
FIG. 1A comprises the upper portion of the device and FIG. 1B comprises the components of the lower porton of the device.
Figure 2:
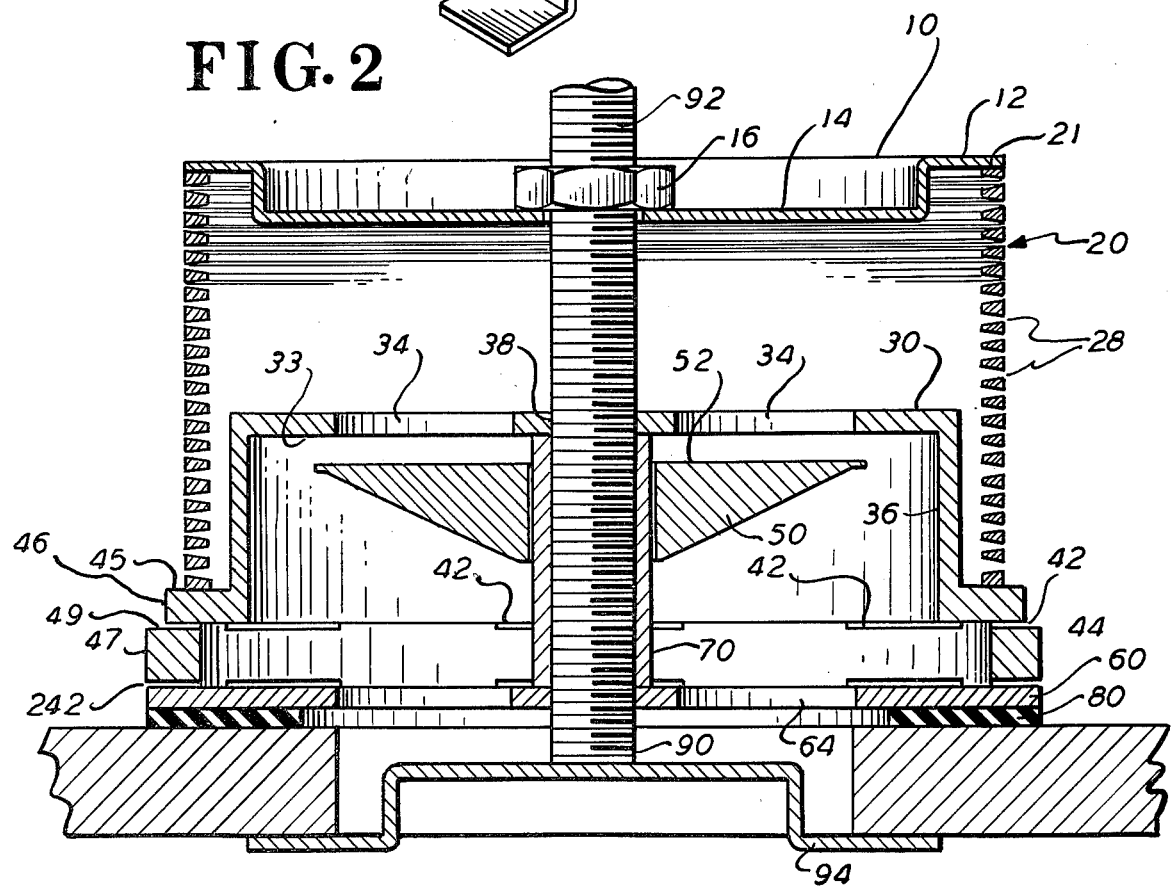
FIG. 2 is a side elevational view of a preferred embodiment of the present invention in assembled form.

The principal components of the present invention comprise a low velocity, high area screen means 20, a tophat separator 30 having a plurality of small circumferential openings 42 therein and a plurality of large orifices 34 in the upper portion thereof communicating with low velocity screen 20 and a valve means 50 for severing flow connection to low velocity screen 20 through orifices 34.

In the preferred embodiment of the invention the low velocity, high volume strainer 20 is on the Johnson well screen type. Such a screen comprises a substantially cylindrical unit 20 having a vertical circumferential strip 21 having a space 28 between each flight. The strip 21 has a triangular cross section with the base of the triangle 26 directed outwardly and the apex 24 directed inwardly so that space 28 is small at the outer perimeter of unit and increases in size in the axially oriented direction. The flights of 21 are held apart by a plurality of spars 22 located on the inner surface of unit 20 oriented parallel to the axis of the unit. The spars 22 cover approximately 10% of the available slot area 28 so that approximately 90% of the slot area 28 is available for the passage therethrough of liquid. A cap 10 comprising a closure plate 14 and a flange 12 is located so as to close off one end of screen 20 in the illustrated embodiment closure plate 14 which fits axially into screen 20 has an axial orifice 18 drilled therethrough.

Tophat unit 30 is located to close off the bottom surface of screen 20. Tophat unit 30 comprises an upper plate portion 47. In the embodiment illustrated the flange comprises an upper surface 45 and the intermediate surface 49 separated by vertical step surface 46. A plurality of slots having the same outer diameter as slots 28 are provided in step 46 and pass completely therethrough into the interior of tophat 30. The existence of intermediate step surface 49 is not critical to the invention thus outer edge of 47 can, in another embodiment of the invention, extend all the way up to surface 45. The depth of orifice 42, that is to say the distance between its top surface on edge 46 and its bottom surface on surface 49, is selected so as to prevent the passage therethrough of the particulate material in the medium in which the strainer is to be used. Typically where ion exchange resins are utilized the depth of slot 42 is of the order of 7 mils. Slots 42 extend around edge 46, the portion of the circumference occupied by the slots is not critical; however it has been found that a total cumulative width of between about 15% and 100%, preferably slightly less than these sum totals is desireable. Especially in the case of resin beds, but not limited thereto, it has been found that a width of about or slightly less than 75% of the circumference of 46 per row of slots gives most satisfactory results.

The upper surface 32 of tophat 30 has a plurality of openings 34 drilled therethrough as well as an axial opening 38. The diameter of surface 32 should be less than the available diameter between opposite slots 22 in strainer 20 since the cylindrical portion 36 of tophat 30 will, upon assembly, fit inside strainer 20. The space between surface 36 and slots 22 may permit either a snug or a loose fit.

A check valve means is provided to be operated to close orifices 34 from the lower surface 33 of plate 32. In the preferred embodiment of the invention as shown said check valve is a float valve of lesser density than the working liquid of the system in which the strainer is to be used. Thus while a slight downward pressure is sufficient to open the valve in the downflow mode, the valve will readily close by flotation in the up flow mode. As illustrated in the preferred embodiment the check valve comprises a flotation valve 50 having an upper surface 52 of sufficient area to block off opening 34 and having an axial opening 58 therethrough. The nature of the surface 52 is, however, not critical provided that its sealing function is performed. The surface may be planar, as illustrated, concave, or have a circumferential annular ring thereon, said annular ring having a substantially planar upper surface. The configuration of the lower surface of check valve 50 is not critical although the frustro-conical configuration shown has been found useful. The strainer is further provided with a float rest plate 60 having a diameter in excess of the inner diameter of the flange portion 47 of tophat 30. The float rest plate 60 has axial opening 68 drilled therethrough as well as larger openings 64. The area of openings 64 is substantially equivalent to the area of openings 34 in portion 32 of tophat 30. The device is further, optionally, provided with a sealant ring 80. The entire device is assembled and held together by a retaining means which will hold float rest 60 on the bottom surface of tophat 30, low velocity strainer 20 on top of flange 45 and cap 10 on top of strainer 20 with float check valve 50 between float rest 60 and bottom surface 33 of plate 32. In the preferred embodiment of the invention as illustrated this retaining means comprises a T-bolt, the bolt portion of said T-bolt passing through openings 68 58, 38 and 18 and being retained by nut 16 located on top of cap 10. The bolt portion of said T-bolt namely the T-bar thereof 90 is suitably provided with a flange 94 whereby the entire device between cap 10 and sealer 80 is located over a conventional strainer plate and T-bar 90 is located on the lower surface of said strainer plate.

In the preferred embodiment as illustrated a cylindrical sleeve 70 is provided around that portion of bolt 92 between the upper surface of plate 60 and lower surface 33 wherein the float valve 50 can move slidably upon said sleeve 70.

In a further embodiment of the present invention a series of slots 242 are ground in the bottom surface of flange 47 of tophat 30 whereby a second series of circumferential slots is provided between the bottom surface of said flange and the top surface of float rest plate 60. It is especially preferred, though not critical, that slots 242 are located directly under the corresponding slot 42, such a preference shall not be considered to exclude a staggered orientation between slots 42 and slots 242.

In a further embodiment of the present invention slots 42 are omitted in favor of slots 242. In yet another embodiment the upper and lower surfaces of slots 42 and 242 are substantially planar and substantially parallel.

In the operation of the device during the downflow stage of operation the working fluid passes through slots 28 (and to a lesser extent slots 42 and 242) through openings 34, around check valve 50 and through openings 64 into the openings in the conventional strainer plate (not shown) into the outflow. The particulate material in the environment is retained on the outside of the strainer since it is too large to pass through slots 28, 42 or 242.

In the upflow mode of operation the injected liquid passes upwardly through openings 64 into the crown portion of tophat 30. Since float valve 50 is, perferably, of lesser density than the working liquid, said float valve 50 moves upwardly around sleeve 70 and surface 52 closes off openings 34 in plate 32 this closure is enhanced by the back pressure of said liquid inflow. The liquid inflow is thus not able to pass through low velocity screen 20 and is forced out of slots 42 and 242 at high velocity giving rise to excellent separating characteristics in the particulate/liquid medium. The following examples illustrate the efficacy of the novel high velocity strainer of the present invention in a mixed anion/cation ion exchange system as compared to the results obtained in the same system using the conventional strainer without the high velocity orifices.

EXAMPLES

A. Resin separation—A series of tests was performed to determine the efficiency of different strainers separating anion resin from a cation bed. Each test consisted of the following:

1. Three strainers were installed in a 24" diameter Plexiglass column (one strainer/sq. ft.).
2. The anion and cation resin were added to the column.
3. The resin was air mixed at a rate of 10 scfm/strainer.
4. The bed was backwashed for 10 minutes.
5. The anion bed (located on the top) and part of the cation bed were sluiced out through a side porthole.
6. The water remaining in the column was drained through the strainers.
7. Resin was carefully scopped out of the column until 3" of resin remained in the column. A cross-section of the resin (3" above the bottom of the column) was scooped out and collected.

9. The resin was carefully scooped out until there was 1″ of resin remaining in the column.

10. A cross-section of the resin (1″ above the bottom of the column) was scooped out.

11. Each sample of resin collected from the bed was then put into a 2″ diameter column.

12. The resin was allowed to settle and the total bed depth was measured.

13. The resin was backwashed in the 2″ diameter column for 5–10 minutes at a 100% expansion.

14. The flow was shut off and the resin allowed to settle.

15. The bed depth of cation resin and the bed depth of anion resin were measured. The ratio of these bed depths to the total bed depth is the volume percent of each resin.

Table I presents a summary of the test data. It can be seen that the standard Strainer (1) contains 10 to 20 volume percent anion resin in the cation bed. A 4″ diameter Johnson well screen (2) was tested. In this test, one row was open to flow, but half of this opening was sealed to prevent any water from flowing through so the row contained 50 percent open area. It can be seen there was a significant improvement in the resin contained in the main part of the bed. The anion resin volume was approximately 5 percent as opposed to 10–20 percent with the standard strainer. This strainer did not give significantly better separation, however, in the peaks that are always found along the wall.

A 3-5/16″ diameter, high-velocity strainer (3) consisting of one row with eight 7 mil slots was tested. The total open area of the eight slots equalled half the open area of a 7 mil high strip placed around the circumference of the strainer. It can be seen that in the main body of the resin bed only trace amounts of anion resin were found in the cation bed. Also, the anion resin contained in the peaks was only 3–6 percent. The high velocity strainer gives much better separation even though the exit velocity was 31 ft/sec as opposed to 40 ft/sec with Strainer No. 2.

B. Distribution—The distribution of a standard strainer can be seen in FIGS. 3 and 4. FIG. 3 shows the distribution of resin 3″ above the strainer plate after a test with three 3¼″ diameter Johnson well screen strainers which contain twenty-two rows, seven mils high. The flow per strainer was 5.5 gpm which resulted in a velocity of 1.1 ft/sec which is typical of strainers used in the industry. FIG. 3 shows that anion resin was separated at the 3″ level from a 7″ diameter circle around the center of the strainer. The remainder of the bed contained mixed cation and anion resin which shows that flow did not reach these areas of the bed. FIG. 4 shows the separation characteristics in the vertical cross-section. It can be seen that the solution flows out of a standard strainer for only about 1″ at the bottom of the strainer plate. The flow tends to diffuse outward as it rises so that at the 3″ level there is a 7″ diameter circle of separated resin. For uniform distribution throughout the tank, strainers would have to be placed on 5¼″ centers.

The better distribution using a high velocity strainer can be seen from the results reported in the previous section in which it was noted that trace volume percents of anion resin were found in the cross-section across the column at the 1″ level. If the solution had not been distributed uniformly throughout the bottom, then significantly higher concentrations such as those in the first and second tests in the above paragraph would have been found.

TABLE 1

| Strainer | No. of 7 mil rows | Backwash flow (gpm) | Exit velocity (ft/s) | Sample from peak | | Sample 1″ | Sample 3″ |
| --- | --- | --- | --- | --- | --- | --- | --- |
| (1) 3-1/4″ dia. Johnson well screen | 12 | 5.5 | 2 | % cation | 77 | 77.6 | 87.5 |
| | | | | % anion | 23 | 22.4 | 12.5 |
| (2) 4″ dia. Johnson well screen | 1 row 50% open = 1/2 | 5.5 | 40.2 | % cation | 82 | 94.6 | 95.3 |
| | | | | % anion | 18 | 5.4 | 4.7 |
| (3) 3-5/16″ dia. high velocity strainer | 1 row 50% open = 1/2 | 3.5 | 30.6 | % cation | 94–97 | >99 | >99 |
| | | | | % anion | 3–6 | trace | trace |

Volume Percent Anion Entrained in the Caton Bed after Backwashing.

We claim:

1. A high velocity composite strainer for use in an environment containing particulate matter, comprising, as coaxially assembled components:

(a) a substantially cylindrical low velocity strainer unit having circumferential slots therein, said slots being open to the passage of the liquid therethrough and having an available width substantially equivalent to the circumference of said low velocity strainer unit;

(b) a cap means placed upon the upper end of said cylindrical strainer unit;

(c) a tophat closure means located within said cylindrical low velocity strainer unit and positioned coaxially therewith, comprising (i) a hollow cylindrical portion, (ii) a top portion closing off the upper end of said cylindrical portion, said top portion having a plurality of openings therethrough, (iii) an outwardly directed flange circumferentially located about the bottom end of said cylindrical portion, the outer diameter of said cylindrical portion and the outer diameter of said flange being such that the cylinder portion of the tophat closure fits readily and slidably inside the low velocity strainer unit, (d) a float rest plate having a plurality of openings therethrough, said openings being located in the central portion of said plate, said plate being located below said flange and coaxially therewith;

(e) a bolt means passing axially through said rest plate said tophat closure, and said low velocity strainer unit;

(f) means for attaching and detaching said bolt means to the cap means and the float rest plate to hold the low velocity strainer unit and the tophat closure, therebetween, (g) a check valve having an axial opening therethrough and an upper surface, said upper surface being adapted to encompass the openings in the upper portion of the tophat closure means, said check valve means being slidably mounted upon the aforesaid bolt means which pass axially therethrough to locate the float means between the rest plate and the bottom surface of the upper portion of the tophat closure whereby, in its most raised position, the upper surface of said check valve seals the openings in the upper portion of the tophat closure;

(h) at least one row of circumferential slots located between the upper surface of the flange portion of the tophat closure and the rest plate, said slots communicating between the inner and outer surfaces of the flange; wherein the depth of said slots in said low velocity strainer unit of paragraph (a) and between said flange portion and said rest plate of paragraph (h) is less than the nominal diameter of the particles in the environment in which said strainer is to be employed.

2. A strainer in accordance with claim 1 wherein the check valve has a density less than that of the liquid portion of the liquid-and-particulate environment in which said strainer is to be employed.

3. A check valve in accordance with claim 1 wherein said check valve has the cross section of an inverted frustrum of a cone.

4. A strainer in accordance with claim 1 wherein the upper surface of the check valve is planar or concave in cross-section.

5. A strainer in accordance with claim 1 comprising a single row of slots located between said rest plate and the upper surface of said flange.

6. A strainer in accordance with claim 1 wherein the sum of the width of the circumferential slots between the rest plate and the flange means is less than 150% of the circumferential distance of said flange.

7. A strainer in accordance with claim 1 wherein the sum of the width of the circumferential slots between the rest plate and the flange is less than 100% of the circumferential distance of said flange.

8. A strainer in accordance with claim 1 comprising at least one row of slots in the outer surface of the tophat flange between the upper and lower surfaces of said flange and additionally comprising a further row of circumferential slots located between the bottom of the flange of the tophat and the float rest plate.

9. A strainer in accordance with claim 8 wherein the sum of the width of the circumferential slots between the upper and lower surfaces of the flange means and the slots between the flange and the float rest plate are each less than 75% of the circumferential distance of said flange.

10. A strainer in accordance with claim 8 wherein the slots of said further row are located directly below the corresponding slots of said single row.

11. A strainer in accordance with claim 1 comprising a single row of slots located between said bottom of the flange of the tophat and the float rest plate.

12. A strainer in accordance with claim 1 wherein the slots of section (h) have planar upper and lower surfaces and said surfaces are mutually parallel.

13. A high velocity composite strainer for use in a fluid environment containing particulate matter comprising:

(a) a first strainer portion having a plurality of openings therein for accommodating a relatively high volume of fluid at a relatively low velocity in a fluid flow path;

(b) a second strainer portion having a plurality of openings therein defining a first fluid flow path for accommodating a relatively high volume of fluid at a relatively low velocity and a second fluid flow path for accommodating a relatively high velocity low volume of fluid, said first fluid flow path of said second strainer portion communicating with said first strainer portion fluid flow path; and (c) means for simultaneously interrupting said fluid flow path in said first strainer portion and said first fluid flow path in said second strainer portion and directing said fluid flow to said second fluid flow path of said second strainer portion.

14. A high velocity composite strainer according to claim 13 wherein said openings have at least one dimension less than the nominal diameter of the particles in said fluid environment in which said strainer is to be employed.

15. A high velocity composite strainer for use in a fluid environment containing particulate matter comprising:

(a) a first strainer portion having a plurality of openings therein for accommodating a relatively high volume of fluid at a relatively low velocity in a fluid flow path;

(b) a second strainer portion having a plurality of openings therein defining a first fluid flow path for accommodating a relatively high volume of fluid at a relatively low velocity and a second fluid flow path for accommodating a relatively high velocity low volume of fluid, said first fluid flow path of said second strainer portion communicating with said first strainer portion fluid flow path in one direction of said fluid flow; and (c) means for simultaneously interrupting said fluid flow path in said first strainer portion and said first fluid flow path in said second strainer portion and directing said fluid flow to said second fluid flow path of said second strainer portion in the opposite direction of said fluid flow.

16. A high velocity composite strainer for use in a fluid environment containing particulate matter comprising:

(a) a high volume low velocity strainer unit having openings between the interior and exterior portions thereof;

(b) a low volume high velocity closeable separator unit having an inner and an outer peripheral surface and at least one row of peripheral openings communicating between said outer and said inner surfaces;

(c) means for providing for fluid flow between the interior portion of said high volume low velocity strainer unit and said low volume high velocity separator unit;

(d) means for interrupting fluid flow between the interior of said high volume low velocity strainer unit and said low volume high velocity separator unit, while permitting the flow into the interior of said low volume high velocity unit and out of the peripheral openings therein.

17. A high velocity strainer according to claim 16 wherein said openings have at least one dimension between said outer surface and said inner surface being less than the nominal diameter of the particles in the environment in which the said strainer is to be employed.

18. A strainer unit in accordance with claim 16 wherein said high volume low velocity unit is mounted substantially coaxially upon said low volume high velocity unit and is separated therefrom by a plate means, said plate means having a plurality of openings therein communicating between said high volume low velocity strainer unit and said low volume high velocity separator unit, and means for closing the openings in said plate.

19. A strainer in accordance with claim 18 wherein the high volume low velocity unit is mounted above the low volume high velocity unit and the closing means for closing the openings in the said plate is a buoyant check valve means.

20. A unit in accordance with claim 19 further comprising a means for retaining said valve means within said low volume high velocity separator.

21. A high velocity composite strainer for use in an environment containing particulate matter, comprising, as substantially coaxially assembled components;
 (a) a high volume low velocity strainer unit having peripheral openings therein;
 (b) a separator means located within said low velocity strainer unit and positioned substantially coaxially therewith including:
  (i) a hollow portion having an upper end and a lower end;
  (ii) a top portion having a plurality of openings therethrough closing off the upper end of said hollow portion;
  (iii) an outwardly directed flange having an outer surface and an inner surface, said flange being peripherally located about the lower end of said hollow portion, the outer dimensions of said hollow portion and the outer dimensions of said flange being such that the hollow portion of the separator means fits readily and slidably inside the low velocity strainer unit;
 (c) a plate having a plurality of openings therethrough, said plate being located below said flange and substantially coaxially therewith;
 (d) means to hold the separator means between the low velocity strainer unit and the rest plate;
 (e) a means for closing the openings in the top portion of the separator means;
 (f) at least one row of peripheral slots communicating between the inner and outer surfaces of said flange disposed between the upper surface of said flange and said plate.

22. A strainer according to claim 21 wherein said slots have at least one dimension between the outside and the inner surfaces of said flange, and the peripheral openings in the low velocity strainer units have at least one dimension between the outer and inner surfaces thereof which are less than the nominal diameter of the particles in the environment in which said strainer unit is to be employed.

23. A strainer in accordance with claim 21 wherein the closing means for closing the openings in the top portion of the strainer means is a check valve having an upper surface, said upper surface being adapted to encompass the openings in said upper portion of said separator means the check valve means being upwardly and downwardly movable between said plate and the bottom surface of the upper portion of the separator means whereby, in its most raised position, the upper surface of said check valve seals the openings in the upper portion of said separator means.

* * * * *

UNITED STATES PATENT AND TRADEMARK OFFICE
CERTIFICATE OF CORRECTION

PATENT NO. : 4,162,975
DATED : July 31, 1979
INVENTOR(S) : Ralph C. Adams et al

It is certified that error appears in the above-identified patent and that said Letters Patent are hereby corrected as shown below:

Column 3, line 15, delete "15%" and insert in place therefor --150%--.

Signed and Sealed this

Fourth Day of March 1980

[SEAL]

Attest:

SIDNEY A. DIAMOND

Attesting Officer

Commissioner of Patents and Trademarks